Nov. 10, 1925.
W. PARKE
OVEN RACK HANDLING DEVICE
Filed Feb. 5, 1925   5 Sheets-Sheet 1
1,560,847
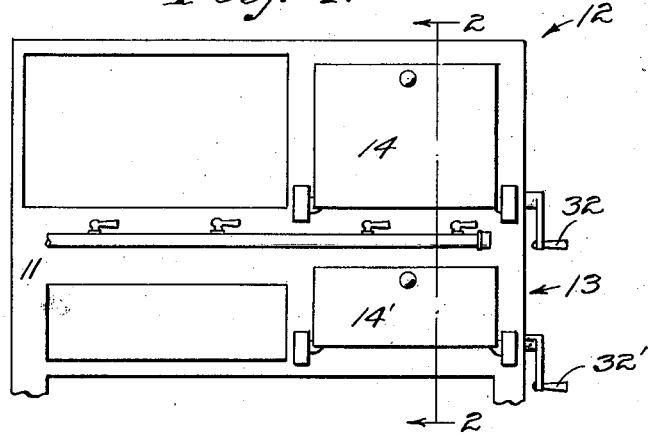
Fig. 1.
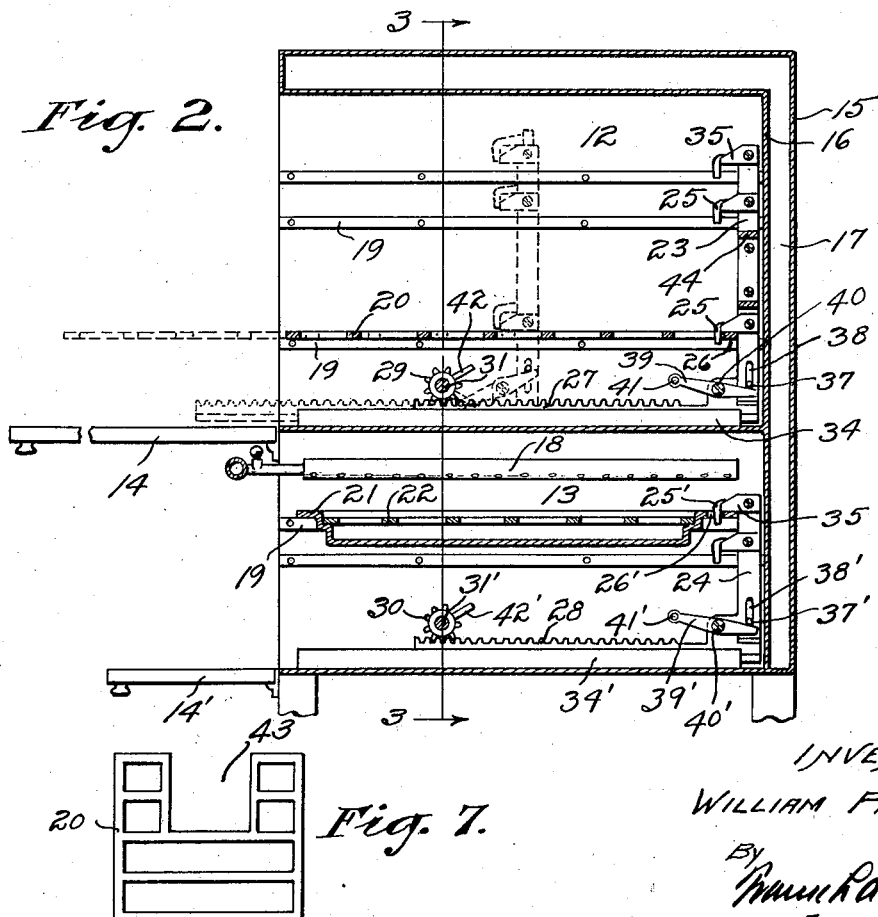
Fig. 2.
Fig. 7.
INVENTOR:
WILLIAM PARKE,
By
ATTORNEY.

Nov. 10, 1925.

W. PARKE

OVEN RACK HANDLING DEVICE

Filed Feb. 5, 1925

INVENTOR:
WILLIAM PARKE,
BY
ATTORNEY.

Nov. 10, 1925.
W. PARKE
OVEN RACK HANDLING DEVICE
Filed Feb. 5, 1925   5 Sheets-Sheet 3
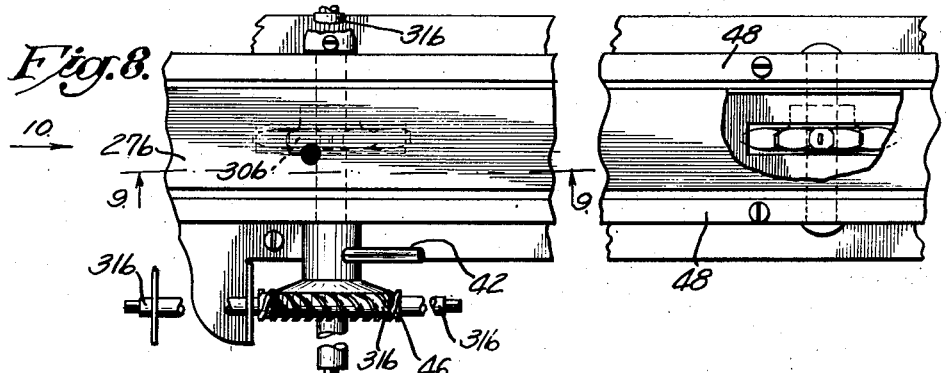
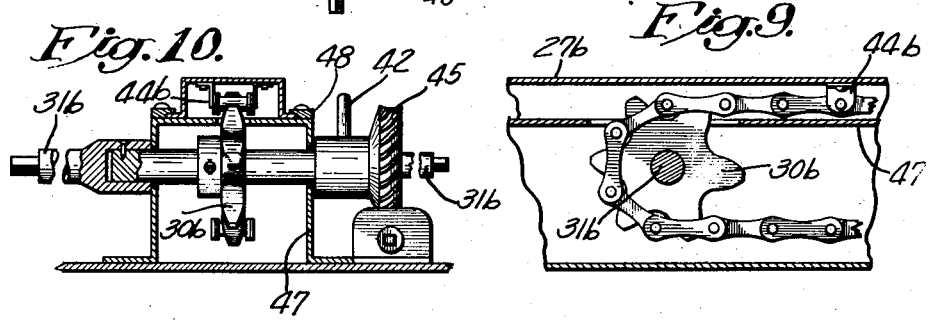
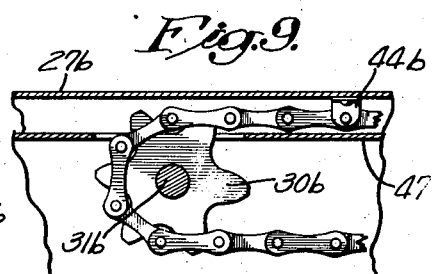
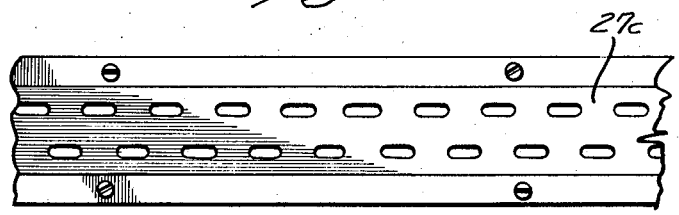
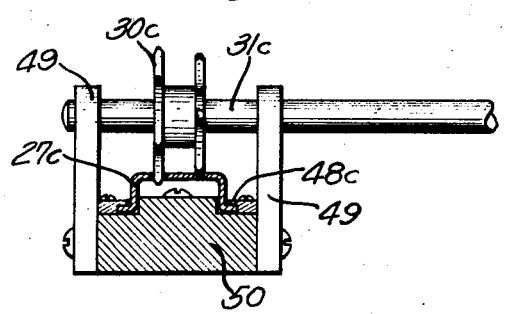
INVENTOR
WILLIAM PARKE
BY
ATTORNEY

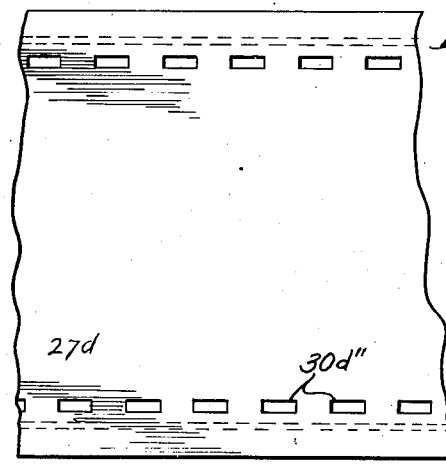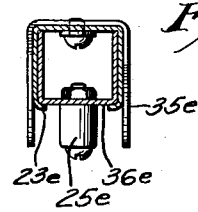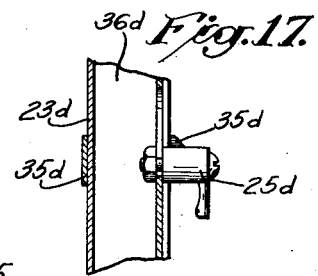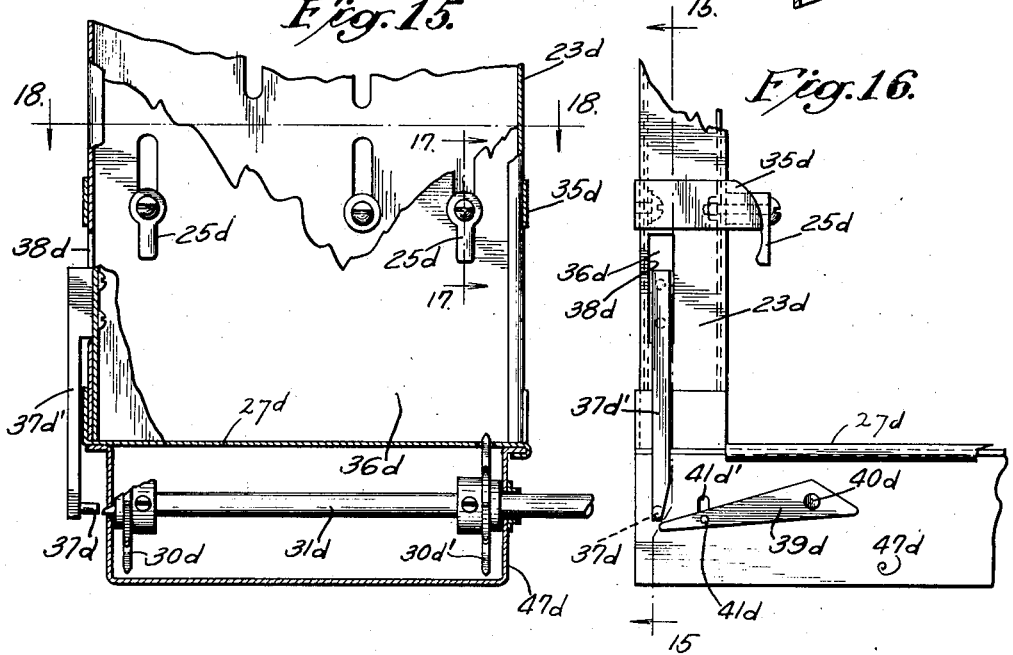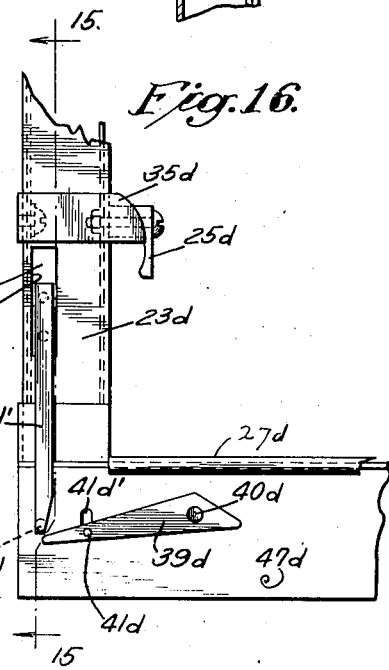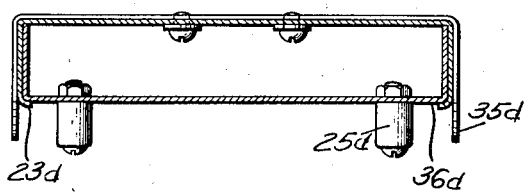

Nov. 10, 1925.
W. PARKE
OVEN RACK HANDLING DEVICE
Filed Feb. 5, 1925
1,560,847
5 Sheets-Sheet 5
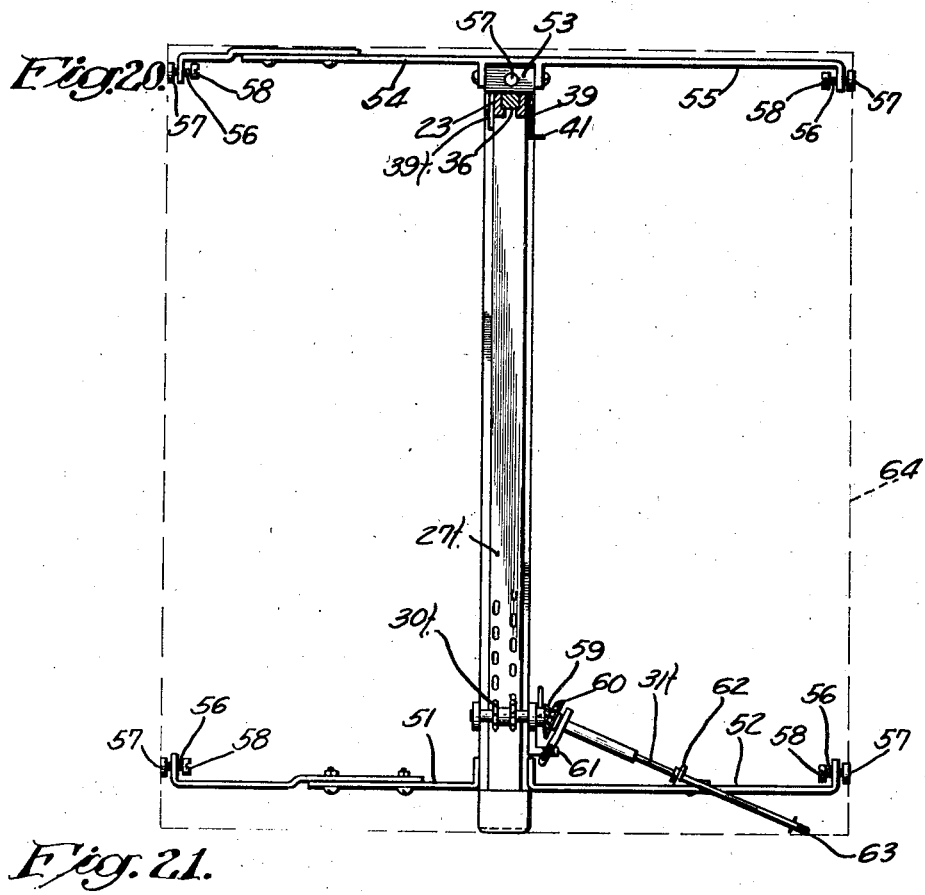
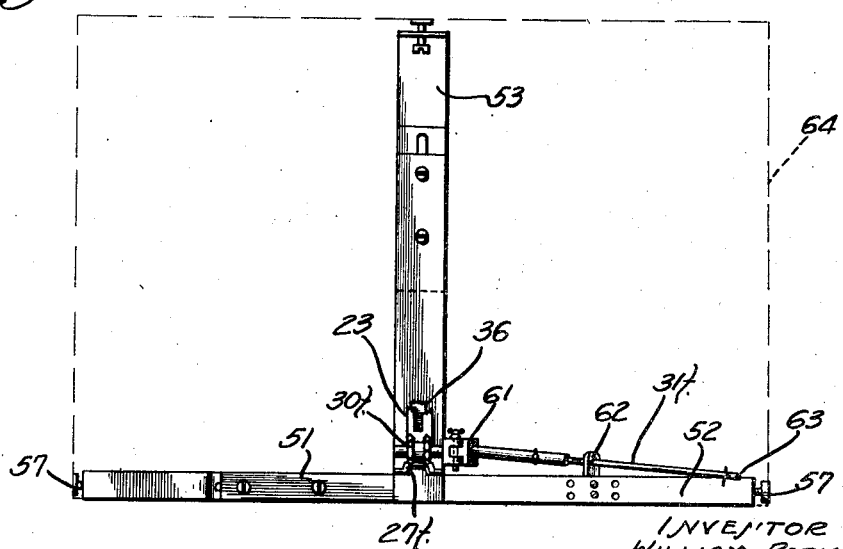
INVENTOR
WILLIAM PARKE Patented Nov. 10, 1925.

1,560,847

UNITED STATES PATENT OFFICE.

WILLIAM PARKE, OF NEW YORK, N. Y.

OVEN-RACK-HANDLING DEVICE.

Application filed February 5, 1925. Serial No. 7,052.

*To all whom it may concern:*

Be it known that I, WILLIAM PARKE, a citizen of the United States, residing at New York, in the county of New York and State of New York, have invented a new and useful Oven-Rack-Handling Device, of which the following is a specification.

This application is a continuation in part of an application, Serial No. 706,381, filed April 14, 1924; and although my present invention is referred to as an oven rack-handling device, it may be understood at the outset that the principles of this invention are not restricted in their application to the handling of the sliding racks with which ovens are ordinarily provided, my invention being hereinafter illustrated as applied also to the manipulation of the corresponding elements, including a roasting pan, within, for example, a broiler, such as is commonly provided in a second oven beneath the main oven of a stove, whether heated by gas or by electrical or other means.

In the use of ordinary cooking stoves employing either gas, electricity, wood or coal, there is one method commonly used to withdraw the rack supporting food. The cook or housewife generally wraps cloths about her hands, or provides equivalent protection, in order to advance a rack out of an oven. This is always a difficult task, involving risks; and every day, throughout the world, there are thousands of cooks or housewives who burn their hands.

It is an object of this invention to provide for a moving of oven racks, or the like, by means of a mechanical device; and the present device is believed to be especially meritorious in that its construction is simple; and, after being incorporated or installed in a stove, it will require no adjusting whatsoever.

In a typical embodiment of this invention, by turning a small crank, or the like, placed outside an oven, a rack or its equivalent may be made to slide smoothly and evenly out; and said rack, or a plurality of racks so moved, will nevertheless be held securely, allowing the cook free use of both hands to attend to the food. Turning the crank in the opposite direction will cause the rack or racks to slide smoothly and quietly back into the oven, without allowing the oven unduly to cool. The cook need not touch the hot rack at all to complete these operations.

By constructions hereinafter described, I may also facilitate the changing of a rack from any one position to another, and I may so dispose the same that any rack or racks may be exempted from control by my mentioned means of mechanical manipulation, or its equivalent.

A device essentially similar to that above referred to may perform the same functions in the broiler oven of a stove, by engaging a roasting pan, or the like, therein; and it is an important merit of my device that it may either be installed as an incident of the original manufacture of stoves or embodiments thereof may optionally be provided as separate articles of manufacture suitable for installation at will in ovens of widely different types, the cost and trouble of installation being entirely negligible in comparison with the benefits derivable therefrom.

Other objects of my invention will appear from the following description of typical embodiments thereof, taken in connection with the appended claims and the accompanying drawings, in which—

Fig. 1 is a front elevation of a stove whose upper oven and broiler oven are respectively equipped with embodiments of my invention.

Fig. 2 is a vertical section on a slightly enlarged scale, this view being taken substantially as indicated by the line 2—2 of Fig. 1.

Figs. 4 and 5 are enlarged detail views illustrating an automatic rack-release hereinafter referred to.

Fig. 7 is a diagrammatic view of a rack or food support provided with means whereby it may be exempted from mechanipulation.

Figure 5:
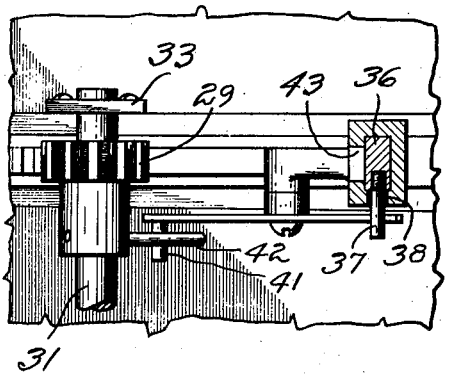

Fig. 8 is a detail view comparable to the left hand portion of Fig. 5, illustrating an embodiment of my invention in which the "teeth" of the slidable "rack" are linked together in the form of a chain, one element of the "rack" being, in this case, an imperforate slide, to which the said chain may be connected at single point. Alternate means for rotating a pinion in the form of a sprocket are also shown.

Fig. 9 is a sectional detail view, taken substantially as indicated by the line 9—9 of Fig. 8.

Fig. 10 is a transverse sectional detail view taken from the direction indicated by the arrow 10 of Fig. 8.

Fig. 11 is a view comparable to Fig. 8, but showing a "rack" in the form of a slotted plate, which may be formed of sheet metal, or the like.

Fig. 12 shows, in side elevation, a sprocket pinion in the form of a wheel having staggered teeth adapted to enter correspondingly staggered slots in such a "rack" as is shown in Fig. 11.

Fig. 13 is a transverse sectional view showing a "rack" of the character illustrated in Fig. 11 as engaged by a sprocket of the type shown in Fig. 12.

Fig. 14 is a view comparable to Fig. 8, or Fig. 11, but showing a "rack" of considerable breadth and rotatable operating elements, which may be regarded as separate sprockets on a common shaft, housed below said rack.

Fig. 15 is a transverse sectional view comparable to Fig. 10 or Fig. 13, but showing a rack and sprockets of the general character illustrated in Fig. 14, and showing also, by a breaking away of parts the lift to the plane of the line 15—15 of Fig. 16, certain optional or alterative features of construction hereinafter referred to.

Fig. 16 is an elevational view taken as if from the left of Fig. 15, but omitting the sprockets and showing more particularly an advantageous alternative construction for lifting my rack-engaging hooks.

Fig. 17 is a detail vertical section taken substantially as indicated by the line 17—17 of Fig. 15.

Fig. 18 is a horizontal section taken as indicated by the line 18—18 of Fig. 15.

Fig. 19 is a similar horizontal section through a vertical operating arm of the general character shown in Figs. 15–17 inclusive, but so narrow as to require but a single row of hooks.

Fig. 20 is a top plan view, with parts broken away, showing an embodiment of my invention comprising a frame adapted to be removably inserted in such ovens as are already in use, and showing also shafts operable at various relative inclinations.

Fig. 21 is a front elevational view of the same.

Referring to the details of those specific embodiments of my invention chosen for purposes of illustration, 11 may be the frame of a stove, of any usual or preferred design, provided with an oven 12, having burners placed beneath the bottom thereof, and optionally also with a second oven or broiler 13, which may be heated by "overhead" burners, these being optionally the same burners employed to heat the upper oven 12; and both of said ovens may be provided with doors, 14, 14', which may swing upon horizontal axes, in a known manner. The ovens referred to, which may be of any size or shape suitable to the intended use of the stove, may be provided with double walls comprising an outer layer of sheet metal 15 and an inner layer 16, which may be separated by an air space 17; and this space may remain empty or it may receive any suitable insulating material (not shown).

When two ovens are associated in the manner above referred to, a single set of burners 18 may be employed to heat either or both of the same; and each of the ovens may be provided, in the usual manner, with substantially horizontal ledges 19, adapted to support and permit lateral movement of sliding racks or oven shelves 20, or of a roasting pan 21, or the like, the latter being commonly employed in connection with the lower or broiling oven and provided with an interior rack 22, adapted to support meats at a suitable elevation above its bottom and beneath the burners 18.

Coming now to the strictly novel features of my invention, I may employ mechanical means such as vertically extending posts or arms 23 and 24 to engage food supports such as the sliding racks 20 and the roasting pan 21, each of these arms being shown as normally resting near the back of an oven and in a position adapting the same, by a horizontal or lateral movement, to push a food support forward, causing the same to project, to any suitable extent, from an oven. To permit of the employment of the mentioned arms in the return or retraction of the mentioned food supports, or their equivalents, I may employ locking or pulling means such as the downwardly extending hooks 25, 25', one of the former being shown as engaging the rear bar 26 of a rack 20, and one of the latter being shown as extending through an aperture 26' in the pan 21. Any preferred means may be employed to impart lateral movement to the mentioned arms, and substantially vertical movement to the mentioned hooks, to effect the engagement or release of the mentioned food supports.

As one suitable organization for moving the mentioned arms and hooks, I have shown, in Figs. 1–5 inclusive, a toothed rack 27, integral or rigidly connected with said arm 23 and extending horizontally. This rack, or its equivalent, may be supported, for example, directly or indirectly from the bottom of an oven, a corresponding rack 28, shown as integral with the arm 24, being optionally provided above or beneath the lower oven or broiler 13, and rotatable elements such as pinions 29, 30, for engagement therewith, may be mounted upon shafts 31, 31', shown as extending to openings through an outer wall 15 and there adapted to be operated by removable or fixed cranks 32, 32'. The respective shafts 31, 31', may be rotatably mounted in plates 33, 33', extending upwardly from the bottoms of the respective ovens and the respective racks 27, 28, may be retained in a substantially horizontal position, regardless of their horizontal movement, in any suitable way, as by means of guides 34, 34', these guides being shown as rigidly secured to the bottoms of the respective ovens.

Any suitable number of ledges 19 may be provided in the respective ovens, and any preferred number of oven shelves or racks 20 or roasting pans 21, or other food supports, may be slidably mounted thereon; and the tilting of these food supports, when projected from an oven, may be restrained, with or without the co-operation of the hooks 25, 25', by means such as the lugs 35, shown as extending forwardly from the respective arms 23, 24. These lugs may be integral with or rigidly secured to the respective arms and adapted to overlie the rear edges of the respective foods supports. When hooks 25, 25' are employed, instead of providing additional and separate means for the manipulation thereof, I may make these hooks integral with or mount them upon vertically sliding bars 36, 36', shown as extending longitudinally of and housed within the respective arms 23, 24 and as provided with operating pins 37, 37' extending through slots 38, 38', and engageable by means such as levers 39, 39', which may be pivoted, as at 40, 40', near the junction of arms 23, 24, with racks 27, 28. These levers may have projections 41, 41', movable by fingers 42, 42', respectively extending at right angles to the shafts 31, 31' and rotatable therewith in such manner that, as the respective racks 27, 28 reach the outer limits of their lateral movement, the fingers 42, 42' are effective to lift the pins 37, 37', thereby elevating the respective sets of hooks 25, 25'.

Alternative operating and hook-lifting means are hereinafter described, but by the foregoing organization, it will be seen that I have provided means whereby, without exposing herself to serious danger of accidental burning, and without permitting avoidable escape of heat from an oven, and without risk to the contents of an oven, a cook or housewife may, upon opening an oven door and manipulating one of the handles or cranks 32, 32', cause a food support to advance into a position favorable to a turning or basting or other necessary operation, the rotation of the mentioned handles 32 in one direction being effective to cause a prompt advance of a food support or food supports, and an opposite movement being correspondingly effective to return the same to its original position.

When it is desirable entirely to release a food support, in order to permit the same to be shifted to a different level within an oven, a rotation of a handle 32, 32' may also be employed to release the same, and, in order to permit a rack or other food support optionally to be so positioned that it shall remain uncontrolled by moving means of the character described, that is to say, in order that any selected racks 20 may be subjected to control by the rotation of a crank 32, or its equivalent, while the remaining racks, or their equivalent, remain at rest, I may optionally employ racks of the general form best shown in Fig. 7. From an inspection of this figure, it will be understood that each rack may be provided with a notch 43, shown as extending forwardly from the rear side thereof, of such dimensions as to permit an arm 23, or its equivalent, to advance without contacting therewith. By the employment of racks of the character just referred to, the orientation of a rack within an oven may predetermine its control or its exemption from control by moving means of the character described; and the construction here referred to can be used as described regardless of whether or not the arms 23, shown as positioned centrally at the rear of the shelves or food supports 20, are provided with pressure-distributing lateral brackets 44, 44', each adapted to engage one or more of the shelves or food-supporting racks 20, and serving incidentally to steady the arm 23.

Figure 3:
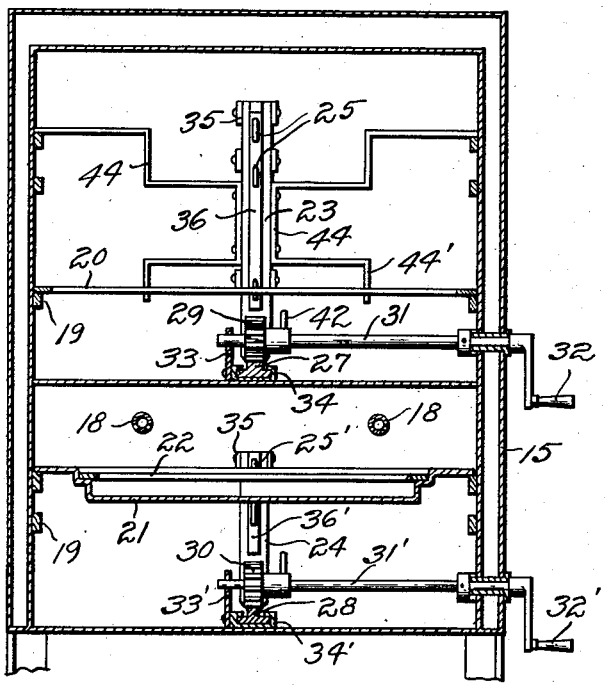
Fig. 3 is a vertical section taken substantially as indicated by the line 3—3 of Fig. 2.
Figure 6:
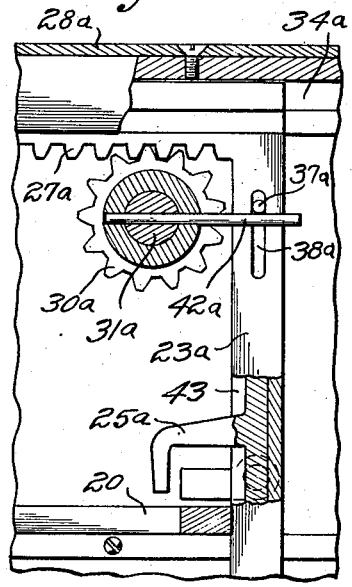
Fig. 6 is a sectional view, corresponding to Fig. 4 but showing how my rack-release may, if desired, be adapted to use in conjunction with an operating rack supported from the top, rather than the bottom, horizontal element of an oven.
Figure 4:
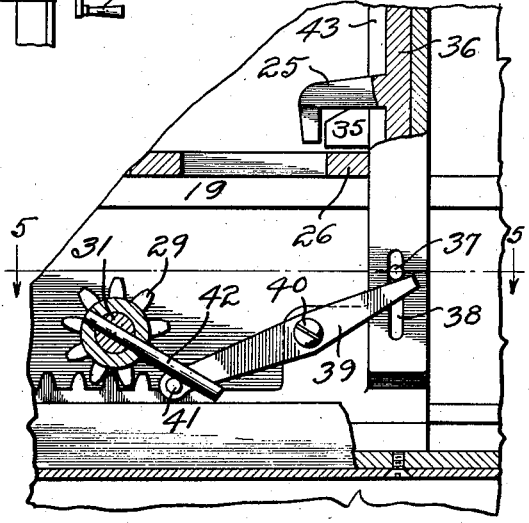

As shown in Fig. 6, an operating arm 23$^a$ for the manipulation of the food supports 20, or their equivalents, may optionally be supported from a top horizontal element of an oven, rather than from the bottom thereof, the rack 27$^a$ being shown as slidable within a guide 34$^a$ secured by a screw to a top plate 28$^a$. A pin 37$^a$ extending through a slot 38$^a$, is then directly engageable to lift the hooks 25$^a$, by means such as the finger 42$^a$, extending through the shaft 31$^a$, carrying the pinion 30$^a$.

In Figs. 8, 9 and 10, I show an alternative means for imparting movement to the arms 23, 23', or their equivalents, the rack of this embodiment comprising a plate 27$^b$, whose teeth may constitute the transverse elements of a sprocket chain, such as the chain which is shown as secured to said plate at 44$^b$, and as extending over a sprocket pinion or pinions 30$^b$. To rotate the sprocket 30$^b$, or its equivalent, whose shaft may carry the mentioned pin 42, or its equivalent, I may employ any or all of the shafts 31$^b$, shown in Fig. 8 as extending in four different directions; and means such as a worm gear comprising the co-operating rotary elements 45 and 46 may optionally be so interposed as to effect any desired change in speed or in the direction of axes. The driving sprocket 30$^b$ may project upwardly from a housing 47, shown as carrying guides 48 for the plate 27$^b$.

In Figs. 11–13 inclusive, I suggest the use of a rack in the form of an apertured plate 27$^c$, with which a pinion in the form of a sprocket 30$^c$, on a shaft 31$^c$, may cooperate, guides 48$^c$ and bearing plates 49 being shown as secured to blocks or strips 50, which may be secured to the bottom of an oven, or the like.

In the embodiments of my invention illustrated in Figs. 15–21 inclusive, extensive use is made of sheet metal, such as cold rolled steel. For example, in Figs. 15–17 inclusive, I show a comparatively broad vertical arm 23$^d$ as comprising a channel element having its forward edges inwardly bent in such manner as to retain a hook-carrying bar 36$^d$, also formed of sheet metal. By providing suitable slots in the relatively movable elements referred to, I may render, both the hooks 25$^d$ and the lugs 35$^d$, when employed, vertically adjustable in adaptation to the levels of different oven racks, or the like, my preferred means for securing these projecting elements being screws or bolts, as shown.

A post or vertical arm of the general character last referred to may provide widely spaced edges engaging oven shelves or the like; and its hook-carrying bar 36$^d$, although structurally resembling the bar 36$^e$ movable within the arm 23$^e$ of Fig. 19, may optionally be provided with a plurality of vertically disposed rows of slots for the adjustable retention of separate rows of hooks 25$^d$, widely spaced apart in a manner favorable to the retraction of oven racks, or the like.

In conjunction with any wide shelf-handling post or arm of the character described, or its equivalent, I may optionally employ also a comparatively wide operating rack, such as the rack 27$^d$ of Figs. 14 and 15; and when such a wide rack is employed, instead of using a single sprocket comprising disks having staggered teeth (as illustrated in Figs. 12 and 13) I may employ a pair of sprockets 30$^d$, 30$^d$, suitably spaced apart on a shaft 31$^d$. Above this the rack 27$^d$, shown as provided with slots 30$^{d''}$, may extend in such manner as to provide, in conjunction with a housing 47$^d$, a substantially complete enclosure for the said sprockets.

In Figs. 15 and 16 I have taken occasion to show also an alternative or additional means for lifting hooks such as are shown at 25, at 25′ and at 25$^d$, a pin 37$^d$ on a projection 37$^{d'}$ (secured to the bar 36$^d$, which projects through a slot 38$^d$) being shown as so disposed as to project inwardly into the path of any suitable elevating means therefor. For the purpose of elevating the pin 37$^d$, to cause a release of oven shelves even without advancing the same far out of an oven, I may employ means such as a cam 39$^d$, shown as pivoted at 40$^d$ and provided with a stop pin 41$^d$, entering a slot 41$^{d'}$ in the housing 47$^d$. When this construction is employed, it will be understood that a comparatively slight advance of the arm or post 23$^d$, is effective to cause an elevation of the pin 37$^d$ to the highest point of the cam 39$^d$, which may be immediately above the pivot 40$^d$ (which may comprise a shaft extending through both vertical walls of the housing 47$^d$) and that either a forward or a backward movement may then permit the pin 37$^d$ to descend,—the pivoting of the cam 39$^d$ enabling the pin 37$^d$ to pass therebelow, from any position in front of said cam, to such a position as is shown in Fig. 16.

Although it is expected that embodiments of my invention may ordinarily be built into ovens by the manufacturers thereof, I show in Figs 20 and 21, an organization comprising a rack-handling device adapted to be sold as a separate article and removably inserted as an entirety in an oven of any ordinary stove, or the like, of suitable dimensions. In this form of my invention, a rack of the general type illustrated in Figs. 11–14 inclusive, or of any preferred type, may be secured to or incorporated in a frame comprising horizontal arms 51 and 52 and an upright arm or arms 53, rear horizontal arms 54 and 55 being optionally added; and any or all of said arms may be extensible and/or provided with adjustable attaching screws 56, shown as provided with feet 57 and with milled heads 58. In order to rotate the spricket 30$^f$, engaging the "rack" 27$^f$, or its equivalent, I may, in this embodiment or in any of the above described embodiments of my invention employ, in preference to a single rigid shaft or a shaft provided with a universal joint, means such as co-operating spiral or beveled gears 59, 60, shown as supported by means comprising a special bracket 61, capable of angular and sliding adjustments; and the diagonal and angularly adjustable shaft 31$^f$, or its equivalent, may obviously be made extensible, and may project through an additional bracket 62, shown as capable of being variously positioned on the arm 52, in order to facilitate such a positioning of the same as shall permit its rotation by, for example, a non-circular head 63, at the outer end thereof, whenever an oven door, or the like, is opened. A removable crank or handle, suitable for use in the rotating of the head 63 and thereby the beveled gears 59, 60 and the sprocket 30$^f$, may be kept within convenient reach, as in any suitable position outside the oven. The interior horizontal outline of the oven may be substantially as indicated by the dotted lines 64; and all of the described movable parts may optionally be fixed to a removable plate having similar dimensions.

The forward end of the entire removable organization described, or its equivalent, may be provided with a projecting and downwardly deflected tongue 65, or the like, as an aid to the positioning and retention or removal of the same. Whether or not any one oven will be provided with both a hook-lifting lever 39 and a hook-lifting cam 39$^f$, as in Fig. 20, this arrangement is within the scope of my present invention.

I have herein described various embodiments of my invention, comprising either built-in or removable moving means adapted to be used in baking ovens or in broiling ovens, or the like; and I have emphasized the fact that a wide variety of means may be employed to impart movement to the vertical posts or arms shown, and to the hooks 25, or their equivalents, regardless of whether these arms project upwardly or downwardly; but it will be understood that various features described may be independently employed, and also that various additional modifications might be made, by those skilled in the art, without the slightest departure from the spirit and scope of my invention, as the same is indicated above and in the following claims.

I claim as my invention:

1. In a stove comprising an oven having a door opening, heating means for said oven, a door in said door opening, and a food support movable laterally within and from said oven, the combination of: food support moving means comprising a substantially vertical arm, movable by a rotatable element, for advancing or retracting said food support at will and independently of the movements of said door.

2. An organization as defined in claim 1 in which said moving means comprises a shaft provided at one end with rotating means and provided near its opposite end with said rotatable element.

3. An organization as defined in claim 1 in which a rack is provided with a guide secured relatively to a horizontal element of said oven.

4. An organization as defined in claim 1 in which said oven is provided with double walls and with advancing and retracting means comprising a shaft extending toward and opening in a wall of said oven.

5. An organization as defined in claim 1 in which said food support is provided with means whereby it may be exempted at will from movement by said arm.

6. An organization as defined in claim 1 in which said advancing and retracting means comprise an arm adapted to engage a food support at any one of several predetermined levels.

7. An organization as defined in claim 1 in which said advancing and retracting arm is provided with separate pushing and pulling means.

8. In an organization as defined in claim 1, moving means effective either to push or to pull a food support and provided with tilt-restraining means.

9. In an organization as defined in claim 1, hooks on said arm, and means for elevating said hooks relatively to said arm.

10. In an organization as defined in claim 1, hooks movable relatively to said food support, and means for withdrawing said hooks to permit a lateral or tilting movement of said food support.

11. An organization as defined in claim 1 in which said substantially vertical arm is adapted to engage a food support centrally of the rear edge thereof.

12. An organization as defined in claim 1 in which said food support moving means is provided with adjustable means for its removable retention in an oven.

13. An oven food support handling means comprising a laterally movable arm and rigidly connected with a rack, a frame provided with clamp means for its installation, and its releasable retention in any oven of suitable dimensions.

14. An oven food support handling means comprising a frame carrying a substantially vertical laterally movable arm rigidly connected with a rack and adapted to be inserted as an entirety, in an oven, said frame being provided with adjustable and threaded clamping means for its retention therein.

15. An oven food support handling means comprising: interior means, laterally movable upon rotation of a shaft, to effect a horizontal shift of a food support; and a shaft having an engageable head immediately accessible through an opening to said oven and rotatable by means of a crank insertable therethrough, said interior means comprising a substantially vertical arm rigidly secured to a slidable rack, and said shaft being provided with means for advancing or retracting said rack.

16. An oven food support handling means comprising a laterally movable arm movable by a rotatable element; and means extensible in various directions for imparting movement to said rotatable element.

In testimony whereof, I have hereunto set my hand at New York, New York, this 22 day of January, 1925.

WILLIAM PARKE.